Figure 1:
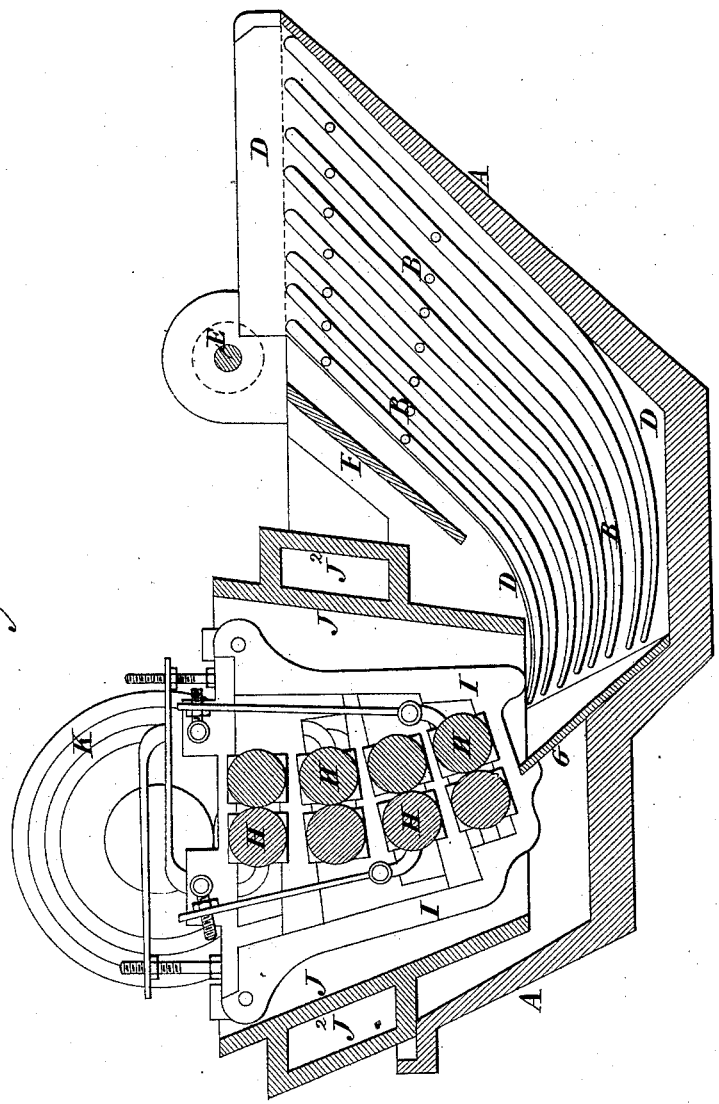

(No Model.) 8 Sheets—Sheet 1.
D. EDWARDS, R. LEWIS & P. JONES.
COATING METAL PLATES WITH TIN OR OTHER METALS.

No. 381,226. Patented Apr. 17, 1888.

(No Model.) 8 Sheets—Sheet 3.
D. EDWARDS, R. LEWIS & P. JONES.
COATING METAL PLATES WITH TIN OR OTHER METALS.

No. 381,226. Patented Apr. 17, 1888.

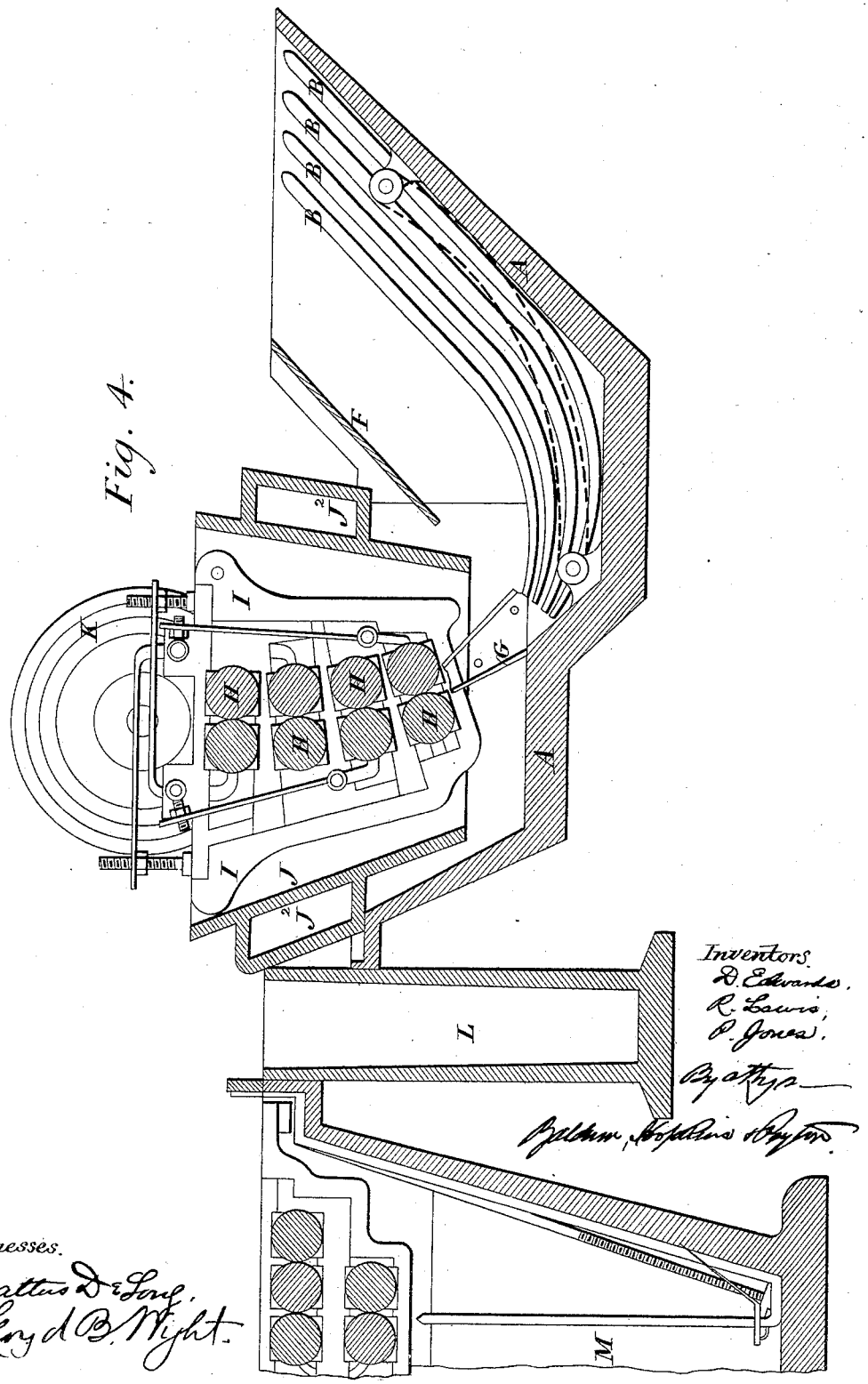

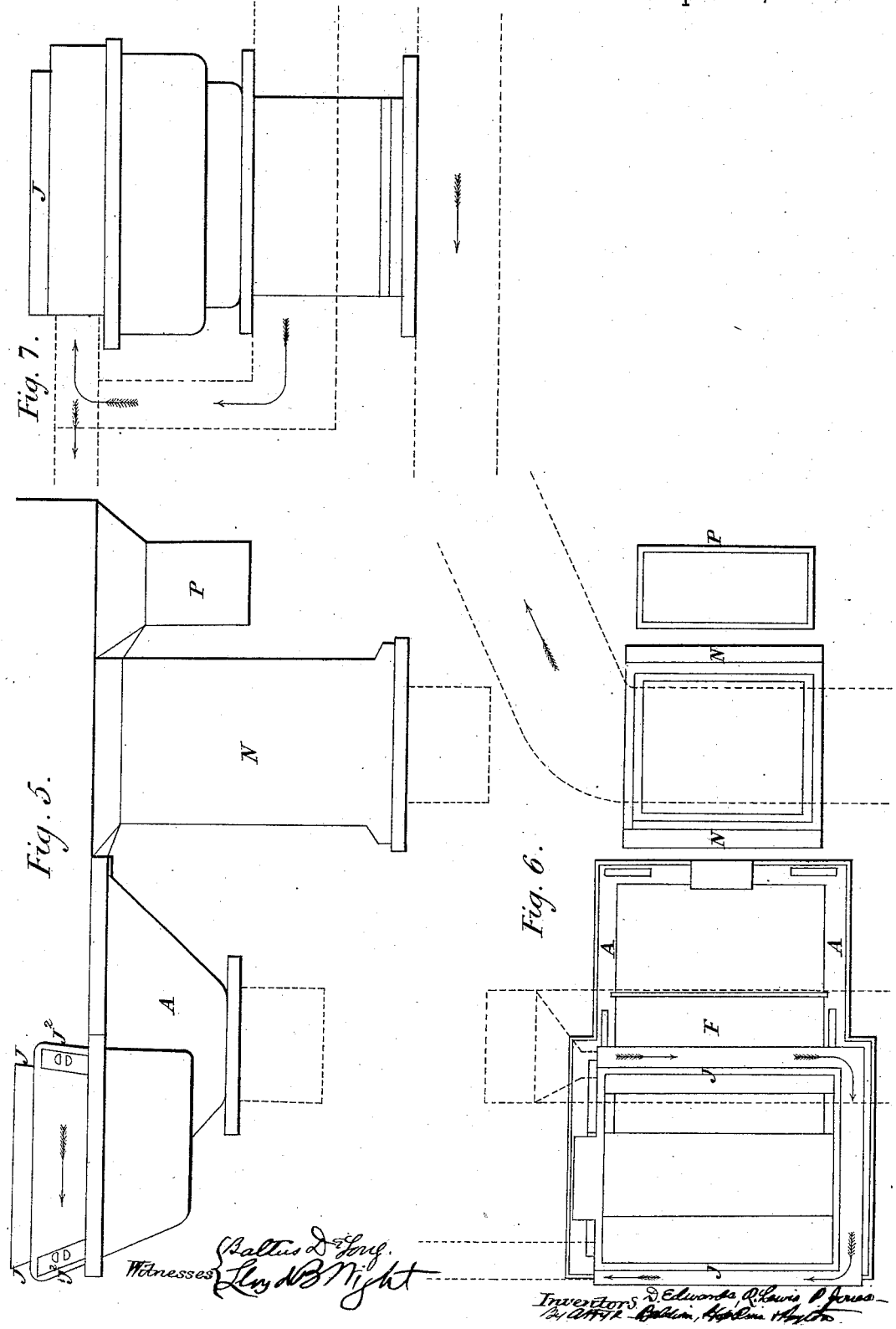

(No Model.) 8 Sheets—Sheet 6.
D. EDWARDS, R. LEWIS & P. JONES.
COATING METAL PLATES WITH TIN OR OTHER METALS.
No. 381,226. Patented Apr. 17, 1888.
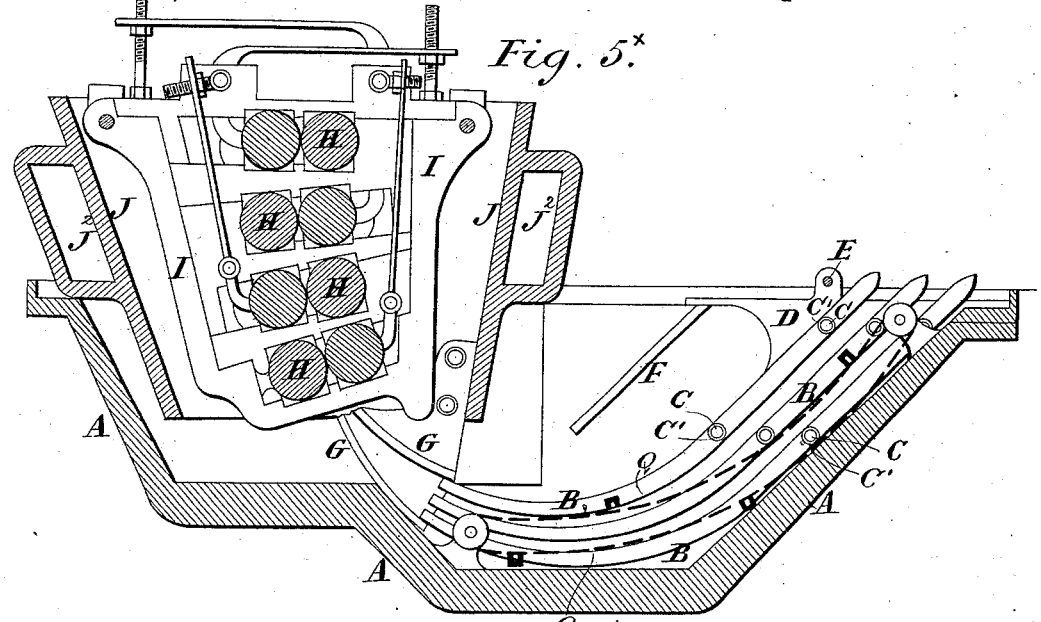
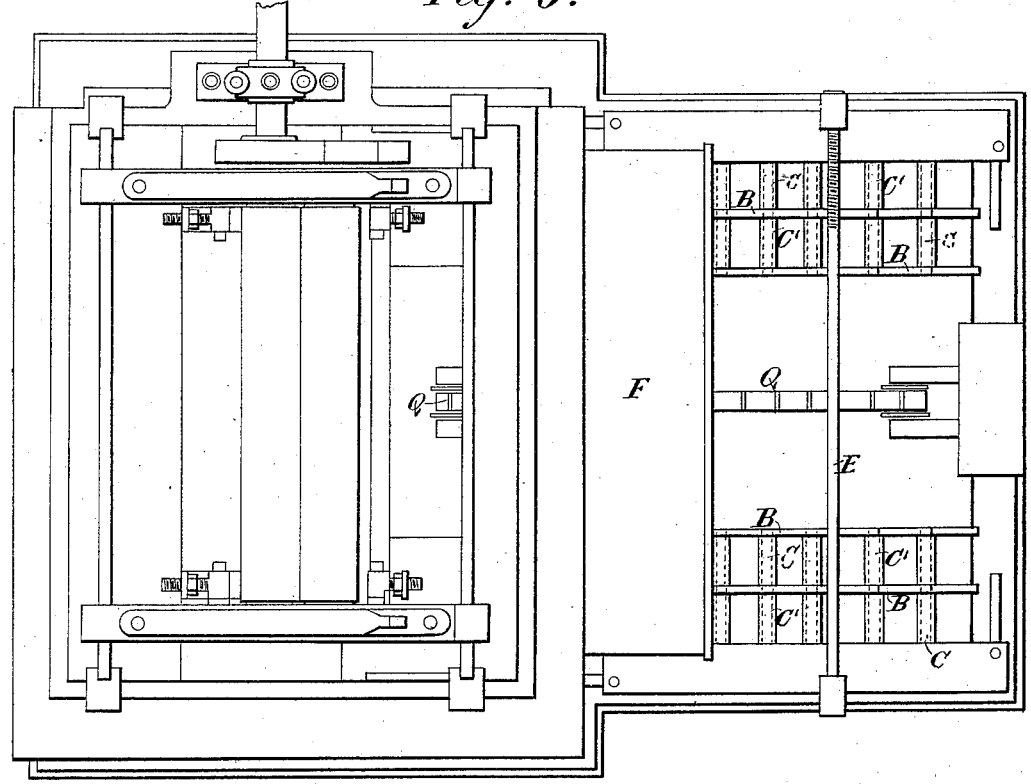
Witnesses. Inventors.

(No Model.) 8 Sheets—Sheet 7.

D. EDWARDS, R. LEWIS & P. JONES.
COATING METAL PLATES WITH TIN OR OTHER METALS.

No. 381,226. Patented Apr. 17, 1888.

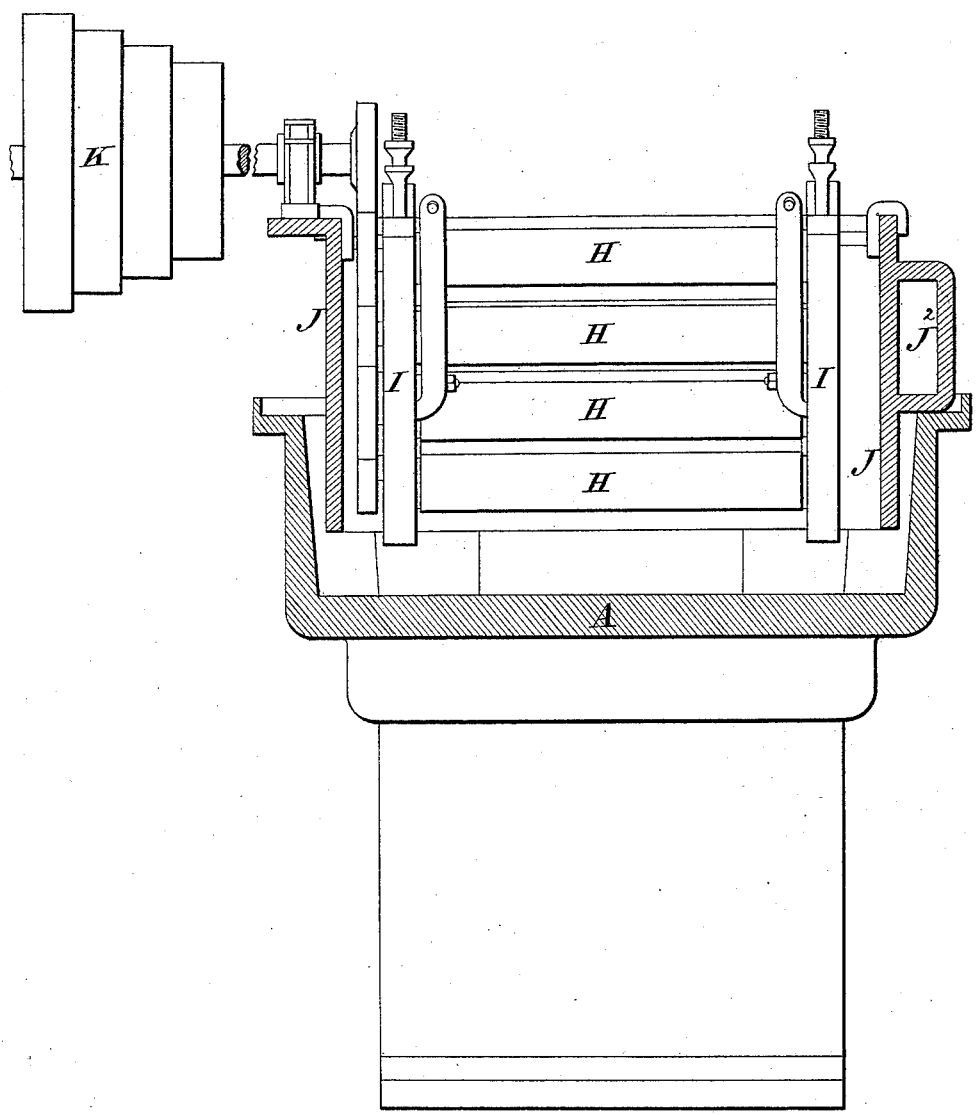

UNITED STATES PATENT OFFICE.

DANIEL EDWARDS, RICHARD LEWIS, AND PHILIP JONES, OF SWANSEA, ENGLAND.

COATING METAL PLATES WITH TIN OR OTHER METALS.

SPECIFICATION forming part of Letters Patent No. 381,226, dated April 17, 1888.

Application filed March 23, 1886. Serial No. 196,269. (No model.)

*To all whom it may concern:*

Be it known that we, DANIEL EDWARDS, tin-plate manufacturer, RICHARD LEWIS, foreman, and PHILIP JONES, mechanic, all of the Duffryn Iron and Tin Plate Works, Morriston, Swansea, England, subjects of the Queen of Great Britain, have invented certain new and useful Improvements in Coating Metal Plates with Tin or other Metal, of which the following is a specification.

Our invention relates to improvements in coating plates of iron, steel, or other metal with tin, terne, or other alloy, in a molten bath of which the plates are immersed, in the manufacture of what is known as "tin" or "terne" plates.

Our object is to uniformly, economically, and expeditiously coat the plates by improving the heretofore-practiced process of successively and continuously treating the plates; and to this end we construct and work the apparatus in which our improved process is effected in the following manner:

We employ a bath or chamber to contain molten coating metal, which is made deep enough to enable us at the entrance end to retain grease, palm-oil, tallow, or any other composition above the molten metal; or, if preferable, we can fix a box or frame in the bath or chamber above the molten metal to enable us to keep a larger quantity of palm-oil, tallow, or any other composition at one end, through which the sheets to be coated are inserted into the bath, and at the opposite end of the bath we likewise provide a grease-hopper, up through which the coated plates are raised between a pair or pairs of rollers. We lead a flue inside or around the outside of this grease-hopper to permit of the palm-oil, tallow, or other compound being kept at the requisite heat or to convey cold air at our option. We also fit into the hopper through which the plates are introduced, and along the bottom of the bath or chamber, a number of bars at a short distance apart from one another to form a stationary grate, curved or any other shape, into the spaces of which the plates to be coated may be inserted, one plate into each space, and after being allowed to remain for a time one above the other in the molten metal may be pushed forward one by one by the workman along the bars of the grate far enough to bring the forward edge of the plate up to the rollers at the exit end of the bath without interfering with any of the other plates lying in the grate.

To lead the plates to the rollers as they are pushed forward from the grate we use an apron-plate with bars riveted onto it or made in one piece, if preferable, over which the plates slide and to which they are conducted to the nip of the rolls. When a plate has been pushed forward from one space or compartment of the grate and has been raised up out of the bath through the rollers, another plate is inserted into that space or compartment. The plate in the next space or compartment is then similarly pushed forward and removed from the bath and its place supplied by a fresh plate, and so on in succession for all the compartments of the grate. In place of the bars forming the grate being continued down from the top of the entrance chamber box or frame nearly to the rollers which lift them out from the bath the grate might be formed of bars descending vertically from the entrance chamber box or frame into the metal bath below it, and the plates be moved sidewise or endwise one by one in succession from the several compartments of the grate to a pair or pairs of vertical rolls, which cause them to travel along the bath to its opposite end, from whence they are then raised to the rolls which are to withdraw them. We, however, prefer to use the arrangement above described. The same end may also be attained, but not so advantageously, by fitting into the ordinary pots (in which a number of plates are usually placed together in bundles) a similar rack or grate composed of grate-bars, so that in place of a bundle of plates being placed all together into and in the same way removed from such pot the plates may be placed one by one into and removed one at a time from the several compartments of the stationary grate.

Figure 2:
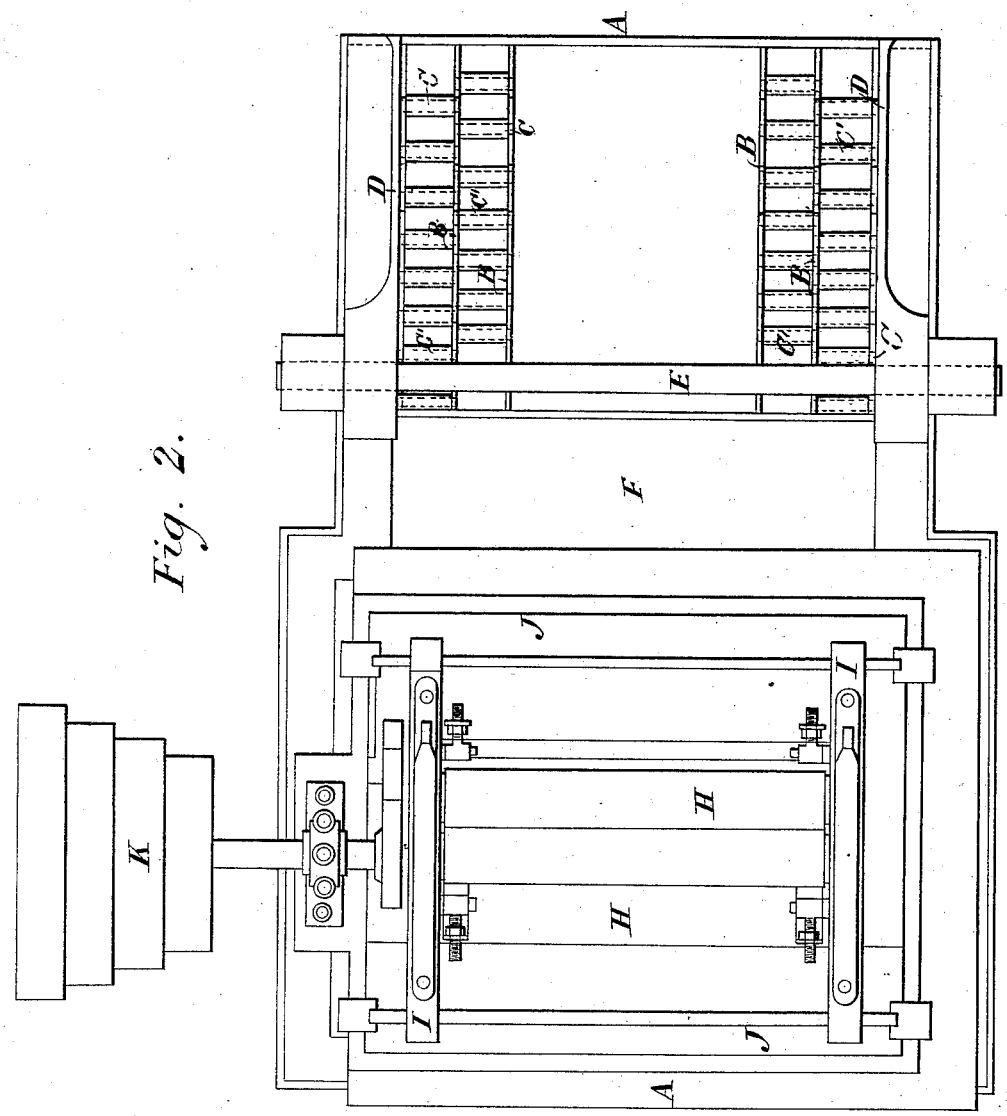
Figure 3:
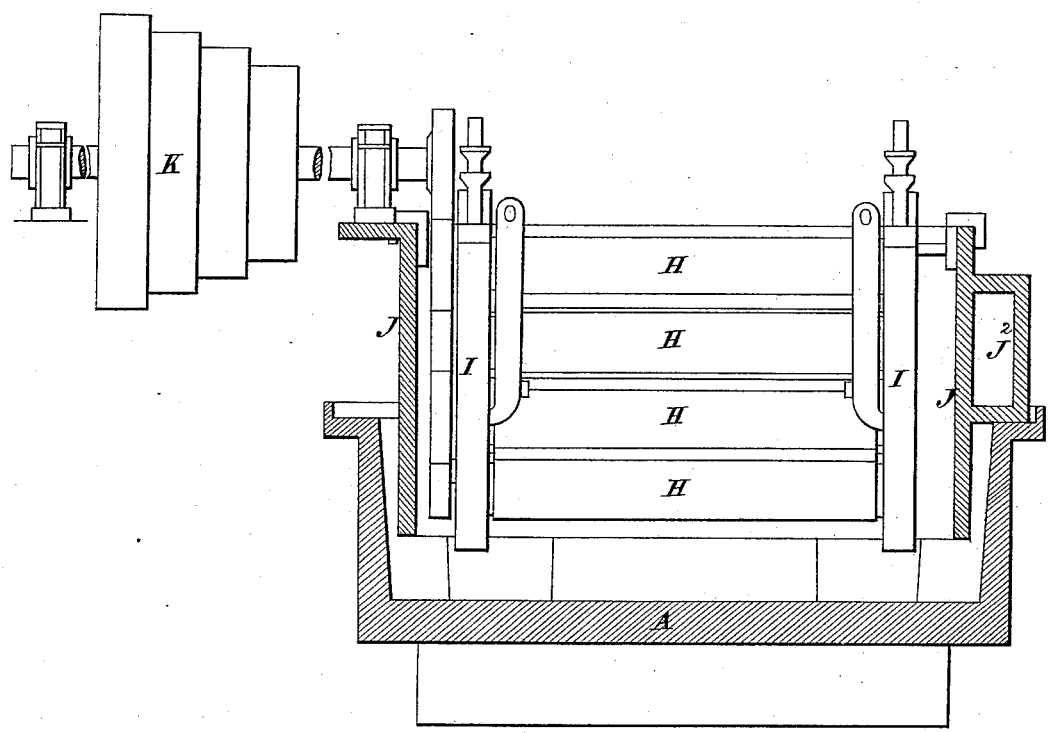
Figure 5:
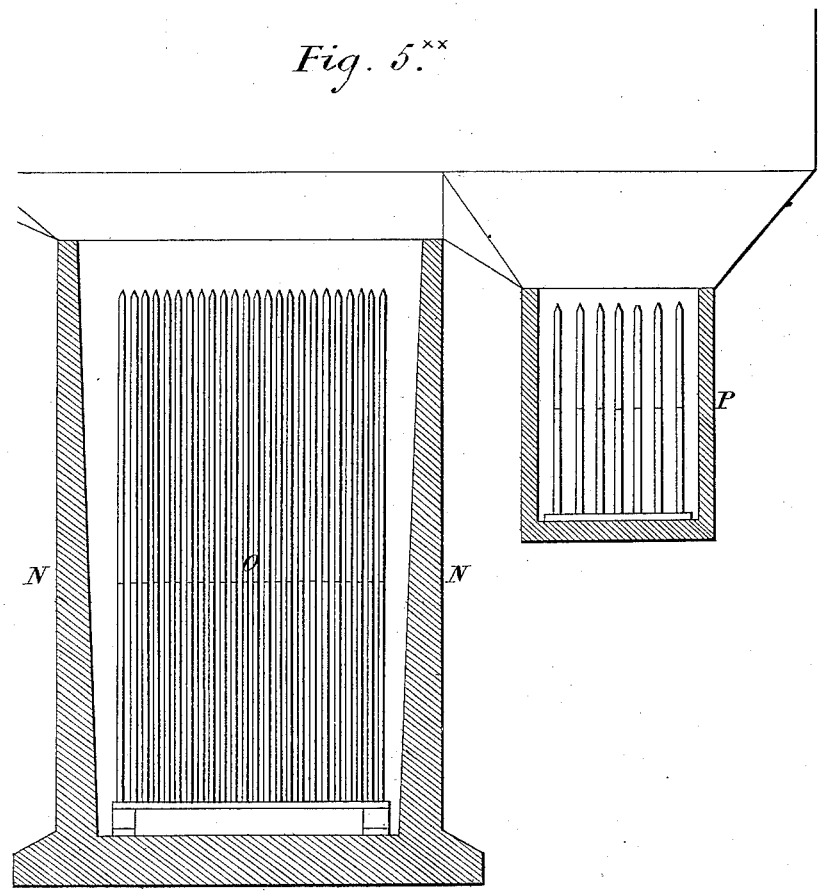
Figure 6:
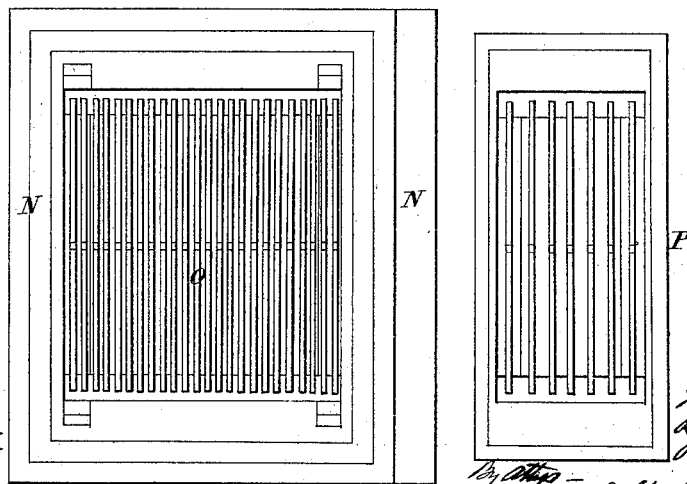

Figure 1 is a longitudinal vertical section of apparatus arranged as hereinbefore first described; Fig. 2, a plan view, and Fig. 3 a transverse vertical section, taken through the hopper at the outlet end of the metal bath. Fig. 4 is a longitudinal vertical section of a similar apparatus, combined with a dripping-pot and five-roll grease-pot. Fig. 5 shows a side elevation, Fig. 6 a plan view, and Fig. 7 an end view, of a modified arrangement of the apparatus for carrying out a modification of the same process. Fig. 5× shows a vertical section, on a larger scale, and Fig. 6× a plan view, of the left-hand portion of the apparatus shown in Fig. 5. Fig. 5×× shows a vertical section, on the same larger scale, and Fig. 6×× a plan view, of the right-hand portion. Fig. 7× shows a transverse section taken through the grease-pot at the withdrawing end of the apparatus shown in Fig. 5×.

A is the pot or receptacle for holding the bath of molten coating metal. It is kept heated by a fire-place below it or in any suitable place, in any ordinary manner, by gas coal or any heating substance.

B B are bars forming a grate, which is in two corresponding sections, one at each side of the bath-receptacle.

C represents bolts or rivets which fasten the grate-bars of the respective parts of the grate together and to plates D, one at one side of the metal pot, the other at the opposite side, so as to constitute a grate-frame. Spacing-collars or tubular distance-pieces C', surrounding bolts C, keep the respectively adjacent bars of the two parts of the grate at proper distances apart in an obvious way. The grate-frame plates D can be slid toward or away from one another and be retained at any desired distance apart by securing them by lock-bolts or otherwise to a bar, E, and the two sections of the grate can so be set at any required distance apart according to the width of plate that is being coated.

F is a plate fixed to the sides of the pot in front of the two plates D. It serves to retain palm-oil, tallow, or any other composition above the surface of the metal. At the entrance end of the pot G G is the apron plate or guide, which leads the plates to the nip of the withdrawing-rolls H whenever the workman pushes a plate forward. To push the plate forward, the workman uses a prong or fork at the end of a rod, or uses tongs or other suitable tool.

The apron-plate G and the bearings of the withdrawing-rolls are, as shown, carried by a frame, I, which is fixed within a hopper, J, which contains palm-oil, tallow, or any other composition at the exit end of the metal pot A.

The lower pairs of rollers are submerged or dip into the coating metal, while the upper rollers may be in the palm-oil, tallow, or any other composition in the hopper above.

The hopper J is, as shown, formed with a flue, J², cast in conjunction with hopper or riveted or screwed to it. It may be of any shape or form around inside or outside of it to convey heat or cold air at option. To permit of the palm-oil, tallow, or any other composition being kept at the required temperature, the flue is fitted with dampers or valves for the admission of cold air whenever the temperature rises above what is required.

The pot is heated by a fire placed below it. Part of the products of combustion of this fire can be allowed to pass away direct to the chimney and part be led upward and into one end of the flue around the grease hopper, and so to the chimney from the other end of the flue.

The rollers are driven by a driving-belt working over the belt-pulley K or by other suitable means. The plates are inserted one by one into the compartments of the grate, so as in succession to fill each compartment with one plate. Each plate of the series, after lying for a time within the molten metal, is in turn, beginning with the one first inserted, pushed forward by means of a prong fork, tongs, or any other suitable tool until its end has reached the withdrawing-rolls. The plate is then withdrawn by these rolls and a new plate is introduced to fill the compartment from which the plate has been so taken, and so on in succession.

By making the pot short and deep, so that one sheet will reach the rolls, the work can be readily and easily carried on, and by having a number of bars, so that each sheet may be allowed to remain for a time in the coating metal before being passed forward to the rolls, ample time is given for the molten metal to adhere to the plates, and superior plates are obtained with considerably less labor than in the ordinary way.

Fig. 4 shows the apparatus combined with a dipping-pot, L, and grease-pot M.

With the apparatus shown at Figs. 5, 5×, 5××, 6, 6×, 6××, 7, and 7× the plates are first placed one by one into an ordinary pot, and then finished with apparatus such as shown at Fig. 1, except that the grate is formed with two compartments only, as the plates need not remain so long in the coating metal, owing to their having been previously coated. N is the pot containing the alloy with which the plates are to be first coated; O, the grate (see Fig. 6××) contained in this pot; and P, the grease-pot, into which the plates are placed before putting them one by one into the grate O in the pot N. The plates are first inserted into the grease-pot. From there they are removed one by one and each put separately into a compartment of the metal pot N, and from this metal pot they are again taken one by one and passed through the apparatus shown at Fig. 5×, the plates being inserted and removed in the manner before explained, while the coating operation is carried on continuously upon successively-supplied plates. The parts of this apparatus are marked with the same letters of reference as in Fig. 1, so that it is unnecessary to give any further description of it.

In some cases we use a chain, Q, Figs. 4 and 5×, passing over two loose sheaves—one at each end—with lugs on it to carry the plates forward to the withdrawing-rollers. The lugs may be movable to allow us to work any sized plates. When a chain is used, one compartment only of the grate would be used. We can also insert a plate between the two plates D of the grate-frame, which we call a "partition-plate." This places us in a position to work two smaller plates instead of one large one, should we require to do so, without changing the grate.

By coating metal plates in the manner hereinbefore described we avoid waste of the coating metal and waste of fuel. The usual brushing with hemp is also done away with. By our mode of working, also, as the plates are placed one by one into the coating metal, the coating metal remains approximately at one uniform temperature, and is not alternately first raised to a high temperature and then chilled by the insertion into it of a large number of plates at the same time, as in one old and still common mode of working. When the metal was so chilled, it was requisite to force the fire to again heat the metal to the temperature required, resulting in a great waste of fuel and of metal.

By our mode of working, the coating metal being kept at a practically uniform temperature, we thereby avoid the deterioration in quality which takes place in such coating metal when it is subjected to such variation of temperature as always takes place when the old method of coating plates inserted many together is adopted, and we also obtain a better-coated and superior plate than by said old method of working. When the plates had to remain soaking for a length of time in chilled coating metal, the coating metal attacked some parts of the surface of the plates before others and consequently was unevenly or unequally deposited on the plates, causing irregularity in the depth of coating and irregularity of surface, and this irregularity could not be removed by subsequent rolling, whereas by our method, as the coating metal is always kept at one uniform temperature, and that best adapted for allowing the coating metal to unite with the surface of the iron or steel plate, and as in addition the plates remain in the metal for like but successive periods of time, and are thus equally acted upon by it, perfect equality of coating is obtained and the plates successively come out from the pot with a smooth, uniform, and equally coated surface, free from scruff and impurities. Further, in our mode of working the quality or toughness of the iron is not in any way affected, as it is in the said old mode of working.

So far as our knowledge extends in the heretofore-practiced method of successively and continuously treating the plates to be coated, the plates, though inserted one by one in the molten coating-bath, were either carried through it from end to end without pause or else were placed a number in each compartment of a rack in the bath in either event necessitating the employment of a lengthy bath; but, in accordance with our improvement in the process, it is essential that the plates be kept at rest for a time in the bath, the period of rest being such as to insure proper coating, and also that each plate occupy a separate compartment and be out of contact with other plates. In practicing our improvement it will be seen that we dispense not only with mechanism used for carrying the plates through the bath one after another, but also avoid objections incident to that plan of working in which a number of plates being placed in contact with each other in each of several compartments requires that the leading plates in the respective compartments be pushed forward by following plates, resulting in frequent clogging or jamming of the plates by their bending or buckling under the pressure applied to them in forcing them forward, thus necessitating stoppage of work to remedy the difficulty. We are able to vary the time occupied in treating the plates without alteration of plate-carrying mechanism such as employed in one of the old ways of working.

Having now particularly described and ascertained the nature of our said invention and in what manner the same is to be performed, we declare that what we claim is—

The improved process of successively and continuously coating metal plates with tin, &c., which consists in inserting the plates one by one and each alone into a molten coating-bath, keeping them separated while in the bath, allowing them to remain therein at rest for like periods of time, moving them forward in succession one at a time in the order in which they were inserted and without previously changing their positions in the bath, passing them through grease or flux composition above the bath, and inserting other plates in the places of the coated plates as the latter are respectively removed, substantially as and for the purpose set forth.

DANIEL EDWARDS.
RICHARD LEWIS.
PHILIP JONES.

Witnesses:
J. HERON THOMAS,
*United States Consular Agent at Swansea, Wales.*
JOHN JENKINS,
*His Clerk.*